US012709096B2

(12) United States Patent
Yasuda et al.

(10) Patent No.: US 12,709,096 B2

(45) Date of Patent: Aug. 18, 2026

(54) SUBSTRATE FOR LIQUID EJECTION HEAD, LIQUID EJECTION HEAD, AND METHOD FOR MANUFACTURING SUBSTRATE FOR LIQUID EJECTION HEAD

(71) Applicant: CANON KABUSHIKI KAISHA, Tokyo (JP)

(72) Inventors: Takeru Yasuda, Kanagawa (JP); Yuzuru Ishida, Kanagawa (JP); Shinya Iwahashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 136 days.

(21) Appl. No.: 18/788,889

(22) Filed: Jul. 30, 2024

(65) Prior Publication Data

US 2025/0065625 A1 Feb. 27, 2025

(30) Foreign Application Priority Data

Aug. 25, 2023 (JP) ................................ 2023-136975

(51) Int. Cl.
*B41J 2/14* (2006.01)

(52) U.S. Cl.
CPC ................................ *B41J 2/14072* (2013.01)

(58) Field of Classification Search
CPC ................ B41J 2/14072; B41J 2202/12; B41J 2/14129; B41J 2/1603; B41J 2/1623; B41J 2/1628; B41J 2/1629; B41J 2/1631
See application file for complete search history.

(56) References Cited

U.S. PATENT DOCUMENTS

| | | | |
|---|---|---|---|
| 9,085,143 B2 | 7/2015 | Ishida et al. | |
| 9,096,059 B2 | 8/2015 | Hatsui et al. | |
| 11,981,133 B2 | 5/2024 | Iwahashi et al. | |
| 12,076,987 B2 | 9/2024 | Yasuda et al. | |
| 2022/0184950 A1* | 6/2022 | Osuki | B41J 2/1753 |

FOREIGN PATENT DOCUMENTS

| | | |
|---|---|---|
| JP | 2021-17054 A | 2/2021 |

* cited by examiner

*Primary Examiner* — Justin Seo

(74) *Attorney, Agent, or Firm* — VENABLE LLP

(57) ABSTRACT

Provided is a substrate for a liquid ejection head including: a heating element that generates an energy for ejecting a liquid; an electrode pad portion that has a wiring layer at a lower layer thereof, is electrically connected to the heating element through the wiring layer, and is electrically connected to an external component through a bonding material; and an insulating protection layer. The electrode pad portion further has a lower electrode layer and an upper electrode layer, the insulating protection layer disposed at a first region overlapping the wiring layer in a film thickness direction has a first opening through which the lower and upper electrode layers are connected, and the insulating protection layer disposed at a position including at least a second region overlapping the bonding material in the film thickness direction has a second opening through which the lower and upper electrode layers are connected.

20 Claims, 8 Drawing Sheets

SUBSTRATE FOR LIQUID EJECTION HEAD, LIQUID EJECTION HEAD, AND METHOD FOR MANUFACTURING SUBSTRATE FOR LIQUID EJECTION HEAD

BACKGROUND

Field

The present disclosure relates to a substrate for a liquid ejection head, a liquid ejection head, and a method for manufacturing a substrate for a liquid ejection head.

Description of the Related Art

A bonding method such as wire bonding has been employed to electrically connect a substrate for a liquid ejection head (hereinafter also referred to simply as "element substrate") and an external circuit board. The materials of electrode pad portions disposed on such an element substrate are selected taking into account the reliability of connection to the bonding material and the chemical resistance to chemicals such as the acidic, alkaline, and organic solvents to be used in the process of manufacturing nozzles which are formed after the element substrate is prepared. Each electrode pad portion has a laminate structure in which, for example, an aluminum (Al) layer to be used as a wiring layer in the element substrate, a barrier metal layer made of a material such as titanium-tungsten (TiW), and a gold (Au) layer to be connected to the bonding material are laminated in this order from the bottom layer. By connecting such electrode pad portions by wire bonding using Au wires or the like, the element substrate is connected to an external circuit board. Here, the surfaces of the electrode pad portions are required to be flatter in order to ensure reliable connection to the bonding material.

Incidentally, an electrical inspection is performed before connecting the element substrate and the external circuit board by the wire bonding in order to avoid mounting an electrically detective element substrate (chip). In this electrical inspection, probing is performed in which an inspection probe is brought into contact with the electrode pad portions. Here, in the case of a laminate film as mentioned above including a Au layer, a TiW layer, and an Al layer in this order, the electrode pad portions may be damaged (dented) by the probing since the Au layer and the Al layer are made of relatively soft materials. Consequently, asperities (probe mark) having a height difference of about 1 m may be formed on the surfaces of the electrode pad portions. Performing the bonding on the portions with this probe mark may impair the reliability of connection between the electrode pads and the bonding material. A technique of Japanese Patent Laid-Open No. 2021-17054 addresses formation of large asperities on electrode pads as described above.

Japanese Patent Laid-Open No. 2021-17054 discloses a configuration in which an iridium (Ir) film (anti-cavitation layer) employed as a protection layer to protect a heating element from physical impacts is used also as a wiring layer in an electrode pad portion. In the technique of Japanese Patent Laid-Open No. 2021-17054, since a metallic material with relatively high hardness, such as Ir, is used as the constituent material of each electrode pad, it is not necessary to form a thick film to hide the probe mark from the pre-mounting electrical inspection. By employing such a configuration, a substrate for a liquid ejection head having electrode pad portions with a reduced film thickness is formed.

The anti-cavitation layer is required to be formed as thin as possible from the viewpoint of thermal efficiency. On the other hand, each electrode pad portion is preferably formed to be thick from the viewpoint of reducing the resistance since it is desirable to generate a necessary current with the least possible electric power. Thus, there has been a demand for electrode pads with high electrical reliability and electrical efficiency.

SUMMARY

An object of the present disclosure is to provide a substrate for a liquid ejection head including electrode pads with high electrical reliability and electrical efficiency.

In an aspect of the present disclosure, there is provided a substrate for a liquid ejection head comprising: a heating element configured to generate an energy for ejecting a liquid; an electrode pad portion having a wiring layer at a lower layer thereof, electrically connected to the heating element through the wiring layer, and electrically connected to an external component through a bonding material; and an insulating protection layer, wherein the electrode pad portion further has a lower electrode layer and an upper electrode layer, the insulating protection layer disposed at a first region overlapping the wiring layer in a film thickness direction has a first opening through which the lower electrode layer and the upper electrode layer are connected, and the insulating protection layer disposed at a position including at least a second region overlapping the bonding material in the film thickness direction has a second opening through which the lower electrode layer and the upper electrode layer are connected.

Further features of the present disclosure will become apparent from the following description of exemplary embodiments with reference to the attached drawings.

DESCRIPTION OF THE EMBODIMENTS

Preferred embodiments of the present disclosure will be specifically described below with reference to the accompanying drawings. Note that the following embodiments do not limit the contents of the present disclosure, and not all of the combinations of the features described in the following embodiments are necessarily essential for the solution provided by the present disclosure. Incidentally, the same components will be described with the same reference sign given thereto.

FIRST EMBODIMENT

<Configuration of Liquid Ejection Head>

A substrate for a liquid ejection head to be described in a first embodiment is mounted on a liquid ejection head. The liquid ejection head is mounted on a liquid ejection apparatus. The liquid ejection apparatus includes a type of liquid ejection head that heats liquids inside liquid chambers by energizing printing elements (heating resistors) to generate bubbles in the liquid chambers by the resulting film boiling in the liquids and to eject droplets from ejection ports with the energy of the bubbles thus generated. Note that, in the present embodiment, an example in which inks are used as the liquids will be described, but the liquids are not limited to inks.

In a case where such a liquid ejection apparatus performs ejection, a region on each heating resistor may be subjected to a physical effect such as an impact resulting from cavitation that occurs when a bubble appears, shrinks and disappears in the liquid at the region on the heating resistor. To protect each heating resistor from the physical effect or any chemical effects, an anti-cavitation layer is sometimes disposed on the heating resistor. The anti-cavitation layer is usually made of a metallic material such as tantalum (Ta) or Ir and disposed at a position that contacts the liquid.

In the present embodiment, a metallic material used as the material of the anti-cavitation layer and having relatively high hardness is also used for electrode pads. An example of a configuration that allows high electrical reliability and electrical efficiency in this case will be described.

<Description of Structure of Substrate for Liquid Ejection Head>

Figure 1:
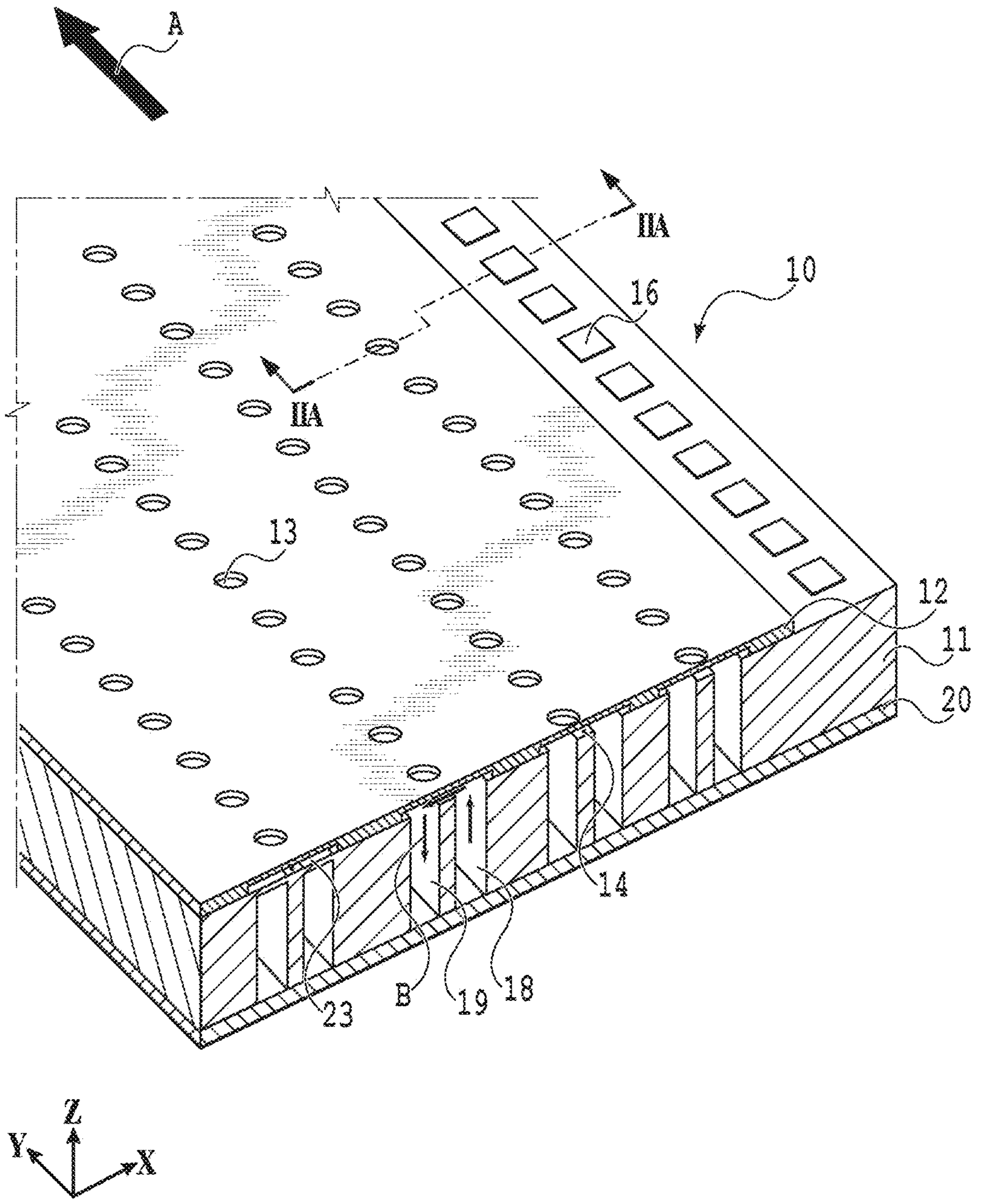
FIG. 1 is a perspective view schematically illustrating a substrate for a liquid ejection head.

FIG. 1 is a perspective view schematically illustrating a substrate for a liquid ejection head (hereinafter also referred to simply as "element substrate") 10 according to the present embodiment. The element substrate 10 has a substrate 11 in which liquid supply paths and the like are formed. The element substrate 10 has an ejection port forming member 12 formed on the front side (+Z side) of the substrate 11 and a cover plate 20 formed on the back side (−Z side) of the substrate 11. Four ejection port arrays each corresponding to an ink color are formed in the ejection port forming member 12 of the element substrate 10. Note that the direction of extension of the ejection port arrays each being an array of multiple liquid ejection ports (hereinafter referred to simply as "ejection ports") 13 (arrow A, Y direction) will be hereinafter referred to as "ejection port array direction". Also, in the present embodiment, an example in which multiple types of liquids (inks) are used will be described, but a single type of liquid (ink) may be used instead.

As illustrated in FIG. 1, at each of positions in the substrate 11 corresponding to the ejection ports 13, there is disposed a printing element 14 that generates an energy for ejecting the liquid. The printing element 14 is disposed inside a liquid channel communicating with the ejection port 13. In the example of FIG. 1, each of the printing elements 14 is a heating resistive element for generating a bubble in the liquid by using a thermal energy. The ejection port forming member 12 defines liquid channels (hereinafter referred to as "pressure chambers") 23 through which the ejection ports 13 and the respective printing elements 14 communicate with each other.

The printing elements 14 are electrically connected to electrode pad portions 16 disposed at an end of the substrate 11 by electric wirings (not illustrated) provided in the element substrate 10. The printing elements 14 in the present embodiment are heating elements that boil the liquids by heating themselves based on pulse signals input via an external wiring substrate (not illustrated) and eject the liquids from the ejection ports 13 with the forces of bubbles generated by this boiling. In the example of FIG. 1, liquid supply paths 18 and liquid collection paths 19 provided in the element substrate 10 and extending in the ejection port array direction communicate with the ejection ports 13 through supply ports (not illustrated) and collection ports (not illustrated), respectively. The cover plate 20 is provided with inlet ports (not illustrated) for supplying the liquids to the liquid supply paths 18 from the outside and outlet ports (not illustrated) for discharging the liquids from the liquid collection paths 19 to the outside. The liquids are circulated in the directions of the arrows B from and to the outside through the liquid supply paths 18 and the liquid collection paths 19. This reduces thickening of the liquids around the ejection ports 13 and stabilizes the liquid ejection performance.

In the present embodiment, the printing elements 14 are each covered with an anti-cavitation layer made of Ta or Ir or a laminate film thereof that faces the pressure chamber 23. In the present embodiment, the anti-cavitation layer is provided at each portion illustrated as a printing element 14 in FIG. 1, and the anti-cavitation layer contacts the liquid. In the present embodiment, the metal iridium is used in the form of a simple substance at least as part of the material of the anti-cavitation layer, but an iridium alloy containing an element such as osmium (Os) or platinum (Pt) in a small amount may be used instead. Each printing element 14 is provided inside the substrate 11 and connected to an electrode pad portion 16 through a wiring connected to the printing element 14. An external voltage is applied to the printing element 14 through the electrode pad portion 16.

Figure 2A:
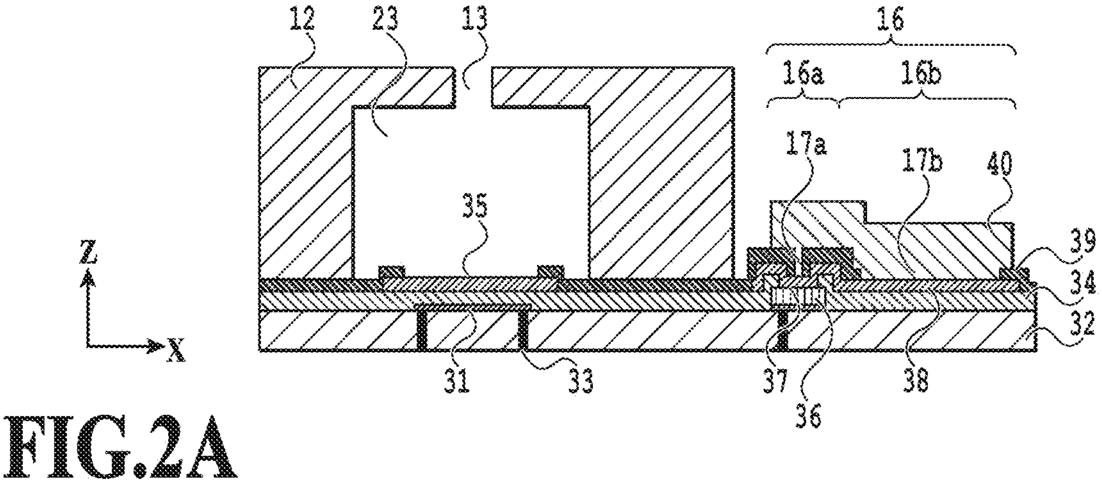
FIGS. 2A to 2C are views explaining the substrate for a liquid ejection head.
Figure 2B:
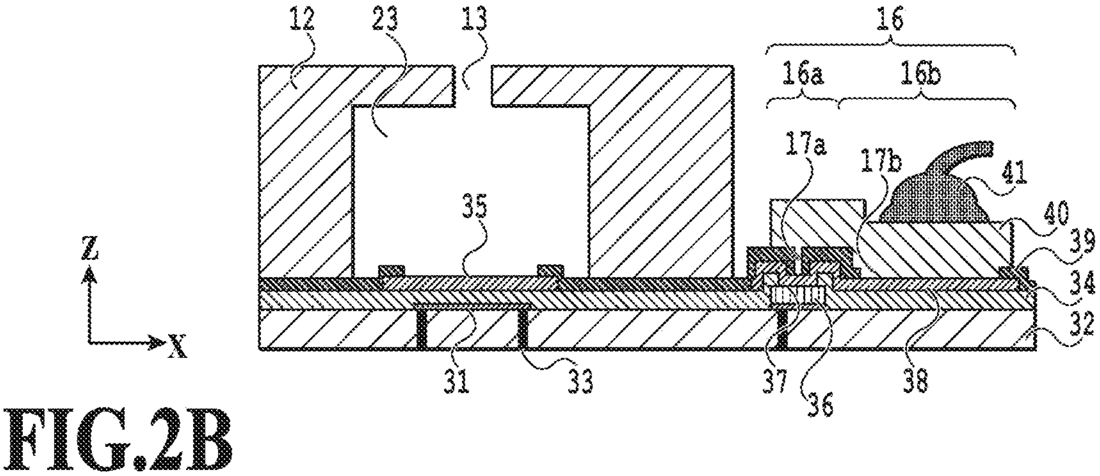
Figure 2C:
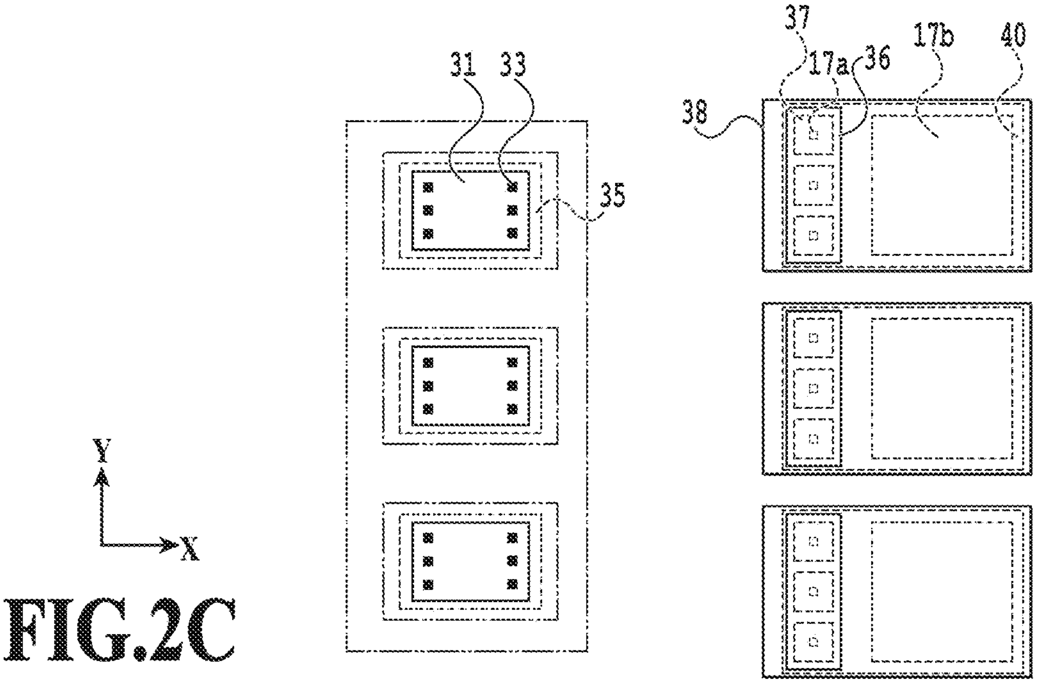

FIGS. 2A to 2C are views explaining the substrate for a liquid ejection head in the present embodiment. FIG. 2A represents a cross section of the element substrate 10 illustrated in FIG. 1 taken along the IIA-IIA line. FIG. 2B is a schematic cross-sectional view of a portion around an electrode pad portion 16 after wire bonding. FIG. 2C is a schematic view representing a plan view of FIG. 2A.

FIG. 2A schematically illustrates the ejection port forming member 12, a portion around an electrode pad portion 16, and a portion around a heating resistive element (also referred to as "heating element") 31 being the printing element 14 disposed directly under an ejection port 13 (so as to face the ejection port 13). Illustration of the underlying portion of the substrate 11 disposed under these (in the −Z direction) and the cover plate 20 is omitted. The element substrate 10 is formed by laminating multiple layers. In the following, the side in the lamination direction of the element substrate 10 on which the ejection ports 13 are provided will be assumed as the upper side (+Z side) and the opposite side will be assumed as the lower side (−Z side). Incidentally, the lamination direction is also the film thickness direction of each of the films forming the above layers.

As illustrated in FIG. 2A, the heating elements 31 made of a cermet material, such as tantalum silicon nitride (TaSiN) or tungsten silicon nitride (WSiN), are formed on a heat accumulation layer 32 made of a silicon oxide. The heating elements 31 are electrically connected to electrode plugs 33 made of W. Moreover, a first insulating protection layer 34 formed of a silicon nitride (SiN) film, a silicon carbide (SiC) film, a silicon carbon nitride (SiCN) film, or a laminate thereof is formed so as to cover the heating elements 31 and their electric wirings. Furthermore, an anti-cavitation layer 35 with its uppermost surface layer made of a material having relatively high hardness and resistant to deformation or breakage by physical forces, such as Ir, is formed on the first insulating protection layer 34 above the heating elements 31. That is, the heating elements 31 are covered with the anti-cavitation layer 35 with the first insulating protection layer 34 interposed therebetween.

Here, as illustrated in the right part of FIG. 2A, around each electrode pad portion 16, there is provided a wiring lead-out layer 36 (also referred to as "wiring layer") electrically connected to a heating element 31. The wiring lead-out layer 36 is made of Al, an alloy of Al and copper (Cu), or the like, for example. The wiring lead-out layer 36 is a lower layer in the electrode pad portion 16. This wiring lead-out layer 36 is electrically connected also to a middle layer 38 in the electrode pad portion 16 formed of the same material and the same layer as the anti-cavitation layer 35, which has an uppermost surface layer made of Ir, through through-holes 37 formed in the first insulating protection layer 34. The middle layer 38 is a lower electrode layer in the electrode pad portion 16. Thus, in the present embodiment, the middle layer 38 in the electrode pad portion 16 and the anti-cavitation layer 35 on the heating element 31 are formed simultaneously (i.e., in the same manufacturing process). This reduces the manufacturing load. Note that, as long as the middle layer 38 in the electrode pad portion 16 is made of the same material as the anti-cavitation layer 35, they may be formed in separate processes.

The wiring lead-out layer 36 forming a lower layer in the electrode pad portion 16 may be obtained by extending a portion of a wiring layer (not illustrated) or formed as a separate body. The electrode pad portion 16 can be seen as two separate regions, namely a first pad region 16*a* where the wiring lead-out layer 36 and the middle layer 38 in the electrode pad portion 16 overlap each other, and a second pad region 16*b* excluding the first pad region 16*a*. In addition, a second insulating protection layer 39 made of SiN, SiC, SiCN, silicon monoxide (SiO), or a laminate of materials selected from the group of these materials is formed so as to cover at least part of the anti-cavitation layer 35. Here, the second insulating protection layer 39 also serves as a layer that improves the adhesion between the substrate 11 and the ejection port forming member 12. In particular, in each electrode pad portion 16, first openings 17*a* and a second opening 17*b* are formed at the first pad region 16*a* and the second pad region 16*b*, respectively, through the second insulating protection layer 39. Each electrode pad portion 16 includes an upper layer 40 made of Au and formed so as to cover at least both the first openings 17*a* and the second opening 17*b*. The upper layer 40 is an upper electrode layer in the electrode pad portion 16.

Here, the first openings 17*a* and the second opening 17*b* are formed as patterns independent of each other. Incidentally, the first openings 17*a* are regions to be subjected to neither probing nor bonding, and are therefore formed to be smaller than the second opening 17*b* so that the pad size can be reduced. Here, multiple second openings 17*b* may be disposed in order to ensure electrical connectability in a case where the opening size is small. The second opening 17*b* is preferably disposed at such a position as not to make the size of the pad portion unnecessarily large. A layout as illustrated in FIG. 2C, for instance, is a preferable layout example. FIG. 2C illustrates an example in which three first openings 17*a* are provided for one second opening 17*b*. FIG. 2C also illustrates an example in which the first openings 17*a* are provided in the ejection port array direction in which the heating elements 31 are arrayed (i.e., the ejection ports 13 are arrayed).

At the boundary between the first pad region 16*a* and the second pad region 16*b*, there is a step originating from the pattern of the wiring lead-out layer 36. At this step portion, the film thickness of the middle layer 38 tends to be small, which raises concerns about electrical reliability. That is, in a case where the film thickness of the middle layer 38 is small, a high-resistance region will be formed in the electrode pad portion 16. This high-resistance region causes an unnecessary parasitic resistance, and thus may result in more than necessary power consumption and concerns about electrical reliability such as breaking of the wiring due to current concentration. However, forming the second insulating protection layer 39 and the upper layer 40 as described above reduces a current that flows in the plane direction of the step portion and thus improves reliability. That is, providing the first openings 17*a* and the second opening 17*b* in the second insulating protection layer 39 as described above and forming the upper layer 40 such that it covers at least both the first openings 17*a* and the second opening 17*b* improves electrical reliability. Specifically, a current flows through a path extending through the upper layer 40 above the second opening 17*b*, the upper layer 40 above the first opening 17*a*, the middle layer 38 under the first openings 17*a*, and the wiring lead-out layer 36, and therefore a current flowing in the plane direction of the step portion is reduced. This improves reliability.

Note that the laminate structure of each electrode pad portion 16 has been described on the assumption that its side to be electrically connected to an external component is the upper or front side while the opposite side thereto is the lower side, but this positional relationship between these sides in the vertical direction does not change by the posture of the substrate for a liquid ejection head 10.

Since the constituent material of the upper layer 40 in the electrode pad portion 16 is Au, it is resistant (chemically resistant) to the acidic, alkaline, or organic stripping solution to be used in the process of manufacturing the ejection port forming member 12, which is a subsequent process, and thus does not dissolve easily. Also, in the present embodiment, from the viewpoint of cost, an electrical inspection is performed on the element substrate 10 after the formation of the middle layer 38 or the upper layer 40 in each electrode pad portion 16 but before the wire bonding with the wire material 41 illustrated in FIG. 2B. This prevents a defective chip from being mounted.

Each electrode pad portion 16 is electrically connected to an external circuit board by wire bonding, lead bonding, or the like. Note that, in a case where wire bonding is performed on the first pad region 16*a*, there is a possibility that the wiring lead-out layer 36 may be deformed by the pressure applied during the bonding and cause an abnormality such as cracking of the first insulating protection layer 34 or the second insulating protection layer 39. The second pad region 16*b*, on the other hand, has no layer that would be deformed by the pressure. Thus, it is preferable to perform wire bonding on the second pad region 16*b*. Also, a barrier metal layer of TiW or the like may be formed between the middle layer 38 and the upper layer 40. This prevents diffusion of the Au to the underlying layer.

FIG. 2B is a schematic cross-sectional view of a portion around an electrode pad portion 16 after the wire bonding with the wire material 41, or the bonding material. As illustrated in FIG. 2B, the surface of the electrode pad portion 16 remains flat. Thus, the connectability and electrical reliability of the wire bonding will not be poor. Also, since the electrode pad portion 16 remains flat although it is subjected to the electrical inspection as described above, it is possible to perform the bonding on the second pad region 16*b*.

Incidentally, as a comparative example not based on the present embodiment, there an example in which the electrode pad portions 16 are made of aluminum (Al). Since Al is a relatively soft material, the electrode pad portions may be damaged (dented) by probing. Consequently, asperities (probe mark) having a height difference of about 1 μm may be formed on the surfaces of the electrode pad portions. Performing bonding on the portions with this probe mark may impair the reliability of connection between the electrode pads and the bonding material. Thus, for pads made of Al as above, the probing region and the bonding region need to be separated. In many cases, the probing region needs to be about 80 μm in width and the bonding region needs to be about 80 μm in width, for example. Accordingly, the pad width become large, making the chip larger than necessary. In the present embodiment, the middle layer 38 in each electrode pad portion 16 is made of the same material as the anti-cavitation layer 35 and is hardly affected by a probe mark, so that the probing region and the bonding region do not need to be separated. Thus, it is possible to make the area of the electrode pad portion 16 small.

Also, the middle layer 38 in each electrode pad portion 16 is a film made of Ir, which is a precious metal that forms no natural oxide film under an air atmosphere at normal temperature. This eliminates need to perform a process of removing an oxide film on the upper surface of the middle layer 38 in the manufacturing process, and thus reduces the load of manufacturing process.

Note that the configuration of each electrode pad portion 16 is not limited to the configuration with the middle layer 38 having a single-layer structure described in the present embodiment, and may be a configuration with a middle layer 38 having a multi-layer structure. In the case of employing the multi-layer structure, it suffices that the surface to be subjected to probing is made of the same material as the anti-cavitation layer. Also, it is preferable to perform the probing on the second pad region 16*b*.

As described above, in accordance with the present embodiment, it is possible to provide a substrate for a liquid ejection head including electrode pads with high electrical reliability and electrical efficiency. Specifically, in the present embodiment, in a case of electrically connecting the element substrate 10 and a component outside the element substrate 10, the middle layer 38 in each electrode pad portion 16 is formed as the same layer as the anti-cavitation layer 35. In this way, it is possible to make the area of the electrode pad portion 16 small. Moreover, in the present embodiment, the first openings 17*a* and the second opening 17*b* are provided in the second insulating protection layer 39 in each electrode pad portion 16, and the upper layer 40 is formed so as to cover at least both the first openings 17*a* and the second opening 17*b*. In this way, a current flows through a first path extending through the upper layer 40 above the second opening 17*b*, the upper layer 40 above the first opening 17*a*, the middle layer 38 under the first openings 17*a*, and the wiring lead-out layer 36. Incidentally, in a second path through which a current flows from the upper layer 40 above the second opening 17*b* into the middle layer 38 under the second opening 17*b* and then through the middle layer 38 in a plane direction to the wiring lead-out layer 36, an electrical connection is established as long as the middle layer 38 is not physically discontinuous. Nonetheless, the value of the sheet resistance of the middle layer 38 is larger than the value of the sheet resistance of the upper layer 40. That is, the resistance ratio of the first path and the second path is so large that only a practically negligible current flows through the second path and does not affect the driving of the liquid ejection head. Thus, in the element substrate 10 in the present embodiment, a current flows practically through the first path, and accordingly a current that flows in the plane direction of the step portion (second path) is reduced. As a result, no large current will flow through the region with a small film thickness in the electrode pad portion 16. This improves the electrical reliability. Also, a high-resistance current path in the plane direction is reduced. Hence, it is possible to provide a substrate for a liquid ejection head including electrode pads with high electrical efficiency. Moreover, it is possible to provide a substrate for a liquid ejection head with no or smaller probe marks.

Incidentally, in the present embodiment, 500 nm or less is sufficient as the thickness of the upper layer 40 to ensure reliability at the step portion of the electrode pad portion 16. While the lower limit of the thickness of the upper layer 40 is not particularly limited as long as an electrical connection is established, it is preferably 50 nm or more and more preferably 100 nm or more. Also, the upper surface of the upper layer 40 is preferably lower than the surface of the ejection port forming member 12 where the ejection ports 13 are formed. In this way, the thickness of the electrode pad portion 16 and a sealing agent that covers the electrode pad portion 16 will not get in the way between the surface where the ejection ports 13 are formed and a print medium, such as paper. Accordingly, the distance between the surface where the ejection ports 13 are formed and the print medium, such as paper, can be short, thus improving the image quality.

Second Embodiment

In the first embodiment, an example in which the middle layer 38 in each electrode pad portion 16 and the anti-cavitation layer 35 are a single-layer structure has been described. In a second embodiment, an example in which the middle layer 38 in each electrode pad portion 16 and the anti-cavitation layer 35 are a two-layer structure will be described. The basic configuration is similar to the example described in the first embodiment, and the difference will therefore be described.

Figure 3:
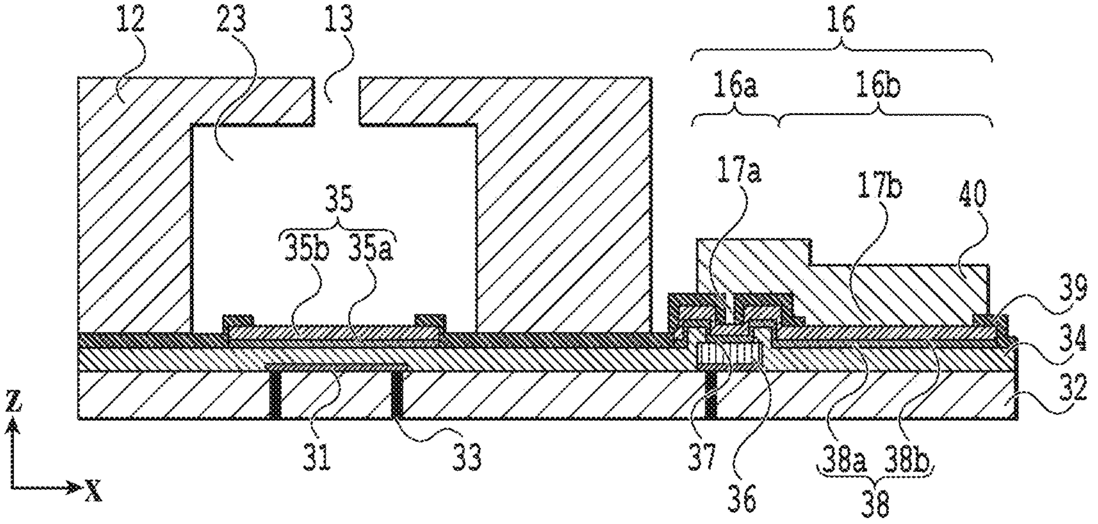
FIG. 3 is a cross-sectional view of a substrate for a liquid ejection head.

FIG. 3 illustrates a cross-sectional view of a substrate for a liquid ejection head in which the middle layer 38 in each electrode pad portion 16 and the anti-cavitation layer 35 each have a two-layer laminate structure with an adhesion layer as a first layer and an Ir film as a second layer. Specifically, the middle layer 38 in each electrode pad portion 16 has an adhesion layer 38*a* as the first layer and an Ir film 38*b* as the second layer. The anti-cavitation layer 35 has an adhesion layer 35*a* as the first layer and an Ir film 35*b* as the second layer. The first layer is a layer under the second layer.

FIG. 3 is a view corresponding to FIG. 2A. Disposing the adhesion layer 35*a* in this manner improves the adhesion between the first insulating protection layer 34 and the anti-cavitation layer 35. Incidentally, it suffices that the adhesion layer 35*a* is an electrically conductive layer with such a property as to allow adhesion between the first insulating protection layer 34 and the anti-cavitation layer 35, and can be formed using a Ta film, for example.

As described above, in accordance with the present embodiment too, it is possible to provide a substrate for a liquid ejection head including electrode pads that has no or smaller probe marks and has high electrical reliability and electrical efficiency. It is also possible to improve the adhesion between the first insulating protection layer 34 and the anti-cavitation layer 35.

Third Embodiment

In the first embodiment, an example in which the middle layer 38 in each electrode pad portion 16 and the anti-cavitation layer 35 are a single-layer structure has been described. In a third embodiment, an example in which the middle layer 38 in each electrode pad portion 16 and the anti-cavitation layer 35 are each a three-layer structure. The basic configuration is similar to the example described in the first embodiment, and the difference will therefore be described.

Figure 4:
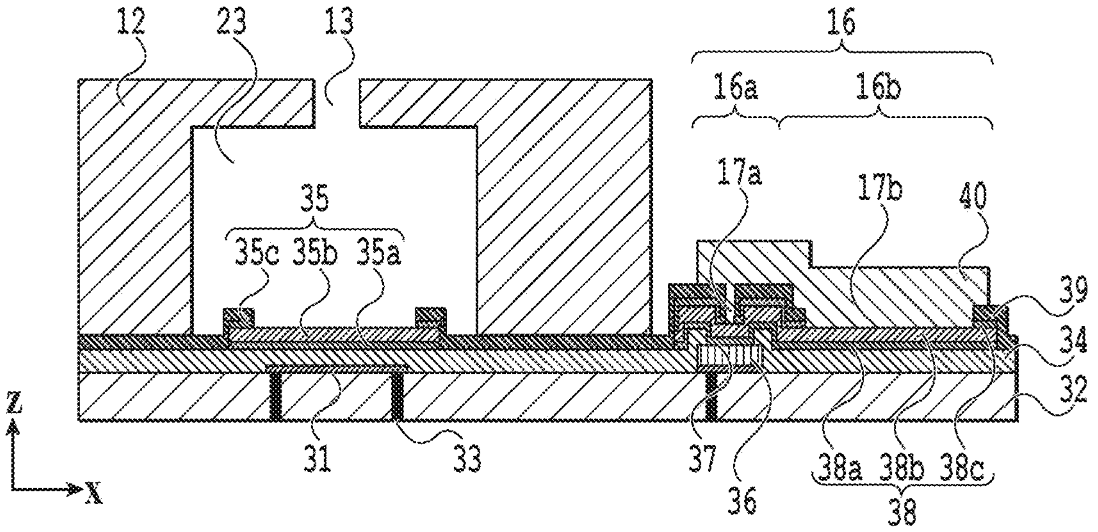
FIG. 4 is a cross-sectional view of a substrate for a liquid ejection head.

FIG. 4 illustrates a cross-sectional view of a substrate for a liquid ejection head in which the middle layer 38 in each electrode pad portion 16 and the anti-cavitation layer 35 each have a three-layer laminate structure. FIG. 4 is a view corresponding to FIG. 2A. This laminate structure has a Ta film as a first layer, an Ir film as a second layer, and a Ta film as a third layer. Specifically, the middle layer 38 in each electrode pad portion 16 has a Ta film 38*a* as the first layer, an Ir film 38*b* as the second layer, and a Ta film 38*c* as the third layer. Also, the anti-cavitation layer 35 has a Ta film 35*a* as the first layer, an Ir film 35*b* as the second layer, and a Ta film 35*c* as the third layer. The first layer is a layer under the second layer, and the second layer is a layer under the third layer.

As illustrated in FIG. 4, on each electrode pad portion 16 and each heating element 31, an opening is formed in the second insulating protection layer 39 and the Ta film as the third layer (35*c*, 38*c*) is removed to expose the Ir film as the second layer (35*b*, 38*b*). Here, it is preferable to remove the second insulating protection layer 39 and the Ta film as the third layer (35*c*, 38*c*) in the same manufacturing step from the viewpoint of the manufacturing load. Specifically, in the present embodiment, the two layers of the first and second layers in the three-layer laminate structure are the layers to be used as the electrode pad portion 16 and the anti-cavitation layer 35 covering the heating element 31. In this case too, the surface of the Ir film in the electrode pad portion 16, which is resistant to formation of a probe mark, is exposed, and probing is performed on this surface. Thus, an electrode pad with no or a smaller probe mark is obtained. Note that the films as the first, second, and third layers have been described specifically as Ta, Ir, and Ta, respectively, in the above. Alternatively, other metallic materials or the like may be used.

Moreover, a Ta film as a third layer (35*c*, 38*c*) may be disposed at regions other than above the heating element 31 or in the electrode pad portion 16 to be utilized as low-resistance electric wirings. This improves the degree of freedom in circuit layout. In this case, however, the film thickness of the Ta film 35*c* as the third layer is preferably 200 nm or less in order to reduce the amount of warpage of the wafer. Moreover, from the viewpoint of electrical resistance, the film thickness of the Ta film 35*c* as the third layer is more preferably 50 nm or more and 200 nm or less.

Also, in FIG. 4, the electrode pad portion 16 and the anti-cavitation layer 35 share the same laminate structure, but their laminate structures do not need to be entirely the same as long as they share the same Ir film (their Ir films are formed in the same manufacturing step).

Figure 5:
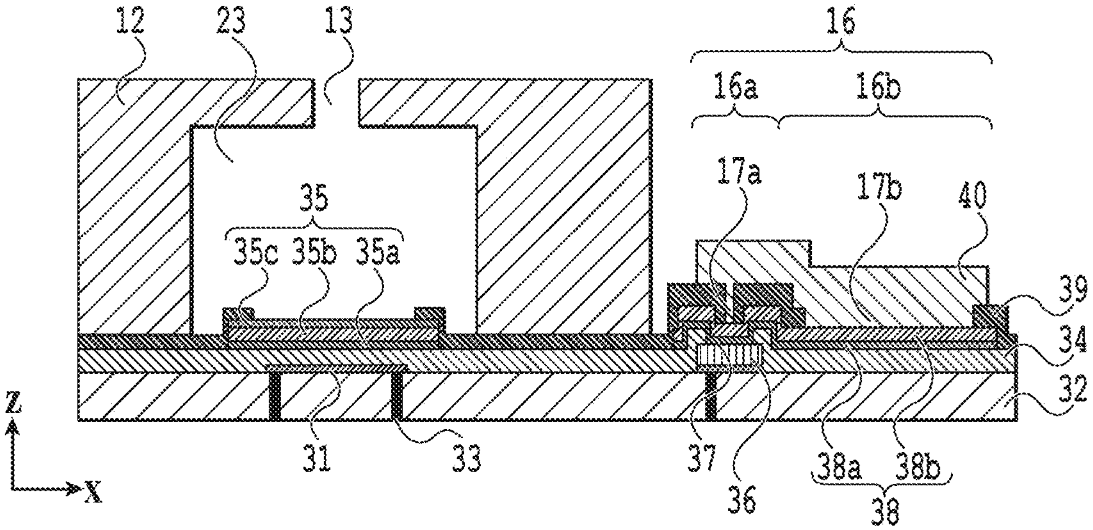
FIG. 5 is a view illustrating a modification.

FIG. 5 is a view illustrating a modification of the present embodiment. FIG. 5 is a cross-sectional view illustrating a substrate for a liquid ejection head similarly to FIG. 2A. FIG. 5 is a view illustrating a modification in which the laminate structures of each electrode pad portion 16 and the anti-cavitation layer 35 are not entirely the same. In FIG. 5, the electrode pad portion 16 includes the Ta film 38*a* as the first layer and the Ir film 38*b* as the second layer. The anti-cavitation layer 35, on the other hand, includes the Ta film 35*a* as the first layer, the Ir film 35*b* as the second layer, and the Ta film 35*c* as the third layer. In this modification, the uppermost surface layer of the anti-cavitation layer 35 is a Ta film from the viewpoint of protecting the heating element 31, and the uppermost surface layer of the electrode pad portion 16 is an Ir film in order to avoid a probe mark on the electrode pad portion 16 from electrical inspection. That is, the layer structures of the anti-cavitation layer 35 and the middle layer 38 in the electrode pad portion 16 are not completely the same.

Note that the Ir film 38*b* included in the electrode pad portion 16 prevents diffusion of the Au making up the upper layer 40 to the underlying layer, and therefore eliminates the need to additionally provide a barrier metal layer of TiW or the like. In other words, it suffices that the lower surface of the upper layer 40 is in contact with the Ir film. Such a configuration is preferable in terms of lowering the manufacturing cost. Also, in the case of using a barrier metal layer of TiW or the like, there is a possibility that the barrier metal layer may be dissolved by a solvent used in the manufacturing process depending on its composition. The Ir film 38*b*, on the other hand, is resistant to such a solvent and free from the concern about dissolution, and is therefore preferable.

EXAMPLES

Specific examples of the configurations the anti-cavitation layer 35 and the electrode pad portions 16 will be described below using drawings.

Example 1

Example 1 is an example corresponding to the first embodiment described above. In the present example, a configuration and a manufacturing method using an Ir film as the anti-cavitation layer 35 as in the first embodiment will be described using FIGS. 6A to 6E.

FIGS. 6A to 6E are step-by-step cross-sectional views explaining a manufacturing process in the present example. Note that, like FIG. 2A, FIGS. 6A to 6E are schematic cross-sectional views of a substrate for a liquid ejection head. Also, like FIG. 2A, illustration of the underlying portion of the substrate 11 and the cover plate 20 is omitted in FIGS. 6A to 6E.

Figure 6A:
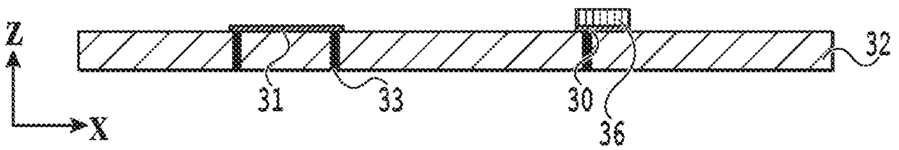
FIGS. 6A to 6E are step-by-step cross-sectional views explaining a manufacturing process.

As illustrated in FIG. 6A, a heat accumulation layer 32 made of SiO and measuring 1 μm in thickness was formed on a substrate (not illustrated) in which driving elements (not illustrated) and wirings for driving the driving elements (not illustrated) were formed. Then, openings were formed in part of the heat accumulation layer 32 using dry etching to provide through-holes. Electrode plugs 33 were formed using W so as to fill those through-holes. Further, as illustrated in FIG. 6A, a cermet material made of TaSiN was formed to a thickness of 15 nm. Moreover, a wiring electrode layer made of an Al—Cu alloy was formed on the cermet material, followed by photolithography and dry etching to form a wiring lead-out layer 36 and heating elements 31. A connection layer 30 was formed from the same material as the heating elements 31 under the wiring lead-out layer 36. Each heating element 31 was formed in a size of 15 μm. For example, each heating element 31 can be formed by, for example, performing dry etching on the laminate of the wiring electrode layer and the cermet material, then removing the wiring electrode layer on the cermet material, and further performing dry etching on the cermet material as necessary. Incidentally, while the configuration was such that each underlying driving element (not illustrated) was connected to the corresponding heating element 31 and wiring electrode layer, which were formed in subsequent steps, through the corresponding electrode plugs 33, the electrical connection to the heating element 31 can be established by feeding power from the wiring electrode layer, instead of using the electrode plugs.

Figure 6B:
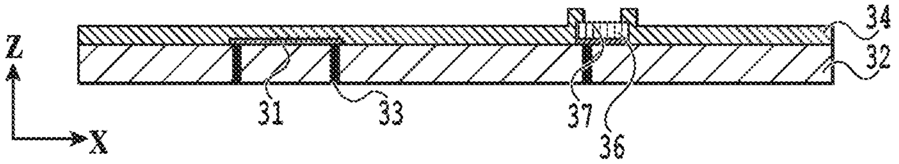

Subsequently, as illustrated in FIG. 6B, a first insulating protection layer 34 made of SiN was formed to a thickness of 200 nm so as to cover the heating element 31 and the wiring lead-out layer 36. Here, the film thickness of the first insulating protection layer 34 was 200 nm from the viewpoint of insulation properties, but a thickness of 100 nm or more should be sufficient. From the viewpoint of thermal transfer to the liquid, it is more preferable to form the first insulating protection layer 34 to a thickness of 100 nm or more and 500 nm or less. Next, a mask (not illustrated) was formed on the first insulating protection layer 34 by photolithography, and through-holes 37 through which to expose part of the wiring lead-out layer 36 were formed in the first insulating protection layer 34, as illustrated in FIG. 6B.

Figure 6C:
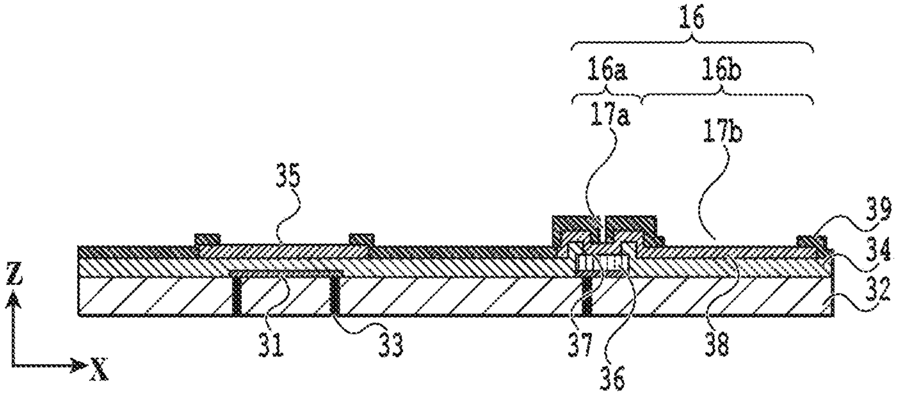

Next, as illustrated in FIG. 6C, a layer made of Ir was formed to a thickness of 100 nm over the entire surface, and this Ir layer was etched form a middle layer 38 in each electrode pad portion 16 and an anti-cavitation layer 35. Note that the film thickness of the Ir only needs to such a thickness as to provide satisfactory anti-cavitation properties, and is preferably 20 nm or more. Further, the film thickness is more preferably 20 nm or more and 300 nm or less from the viewpoint of processability. Also, at each electrode pad portion 16, the middle layer 38, which was made of Ir and formed as the same layer as the anti-cavitation layer 35, was connected to the corresponding wiring lead-out layer 36 through the corresponding through-holes 37. Thereafter, as illustrated in FIG. 6C, a layer made of SiCN was formed to a thickness of 200 nm and etched by photolithography and dry etching to form a second insulating protection layer 39. Disposing such a second insulating protection layer 39 further improves the reliability of portions of the liquid ejection head that contact the liquids in particular. Here, as illustrated in FIG. 6C, the second insulating protection layer 39 was removed from directly above each heating element 31 from the viewpoint of thermal efficiency. Also, first openings 17*a* and a second opening 17*b* were formed in each electrode pad portion 16 for connecting to an upper layer 40 in a subsequent step. As a result, as illustrated in FIG. 6C, the middle layer 38, or Ir, was exposed at the uppermost surface layer of the electrode pad portion 16 at each of the first pad region 16*a* and the second pad region 16*b*.

At this stage, an electrical inspection was carried out by performing probing on the second pad region 16*b*. Since the Ir film was a noble metal film which forms no natural oxide film under an air atmosphere at normal temperature, the probing was stably performed, but the measured value was unstable on some terminals. Later, each terminal with the unstable measurement was closely observed, and portions were found where the Ir was partly discontinuous at the step portion formed by the wiring lead-out layer 36 in the electrode pad portion 16. Note that the surface of each electrode pad portion 16 after the electrical inspection was observed with a laser microscope, and no physical damage or deformation by the probing was found. That is, no effect by the probing was observed even in the case where the electrical inspection was performed in the middle of the process as in the present example. In the electrical inspection, a rhenium (Re)—W probe with a tip diameter φ20 μm, which was a common probe, was used. Also, the amount of overdrive in the probing was 60 μm.

Figure 6D:
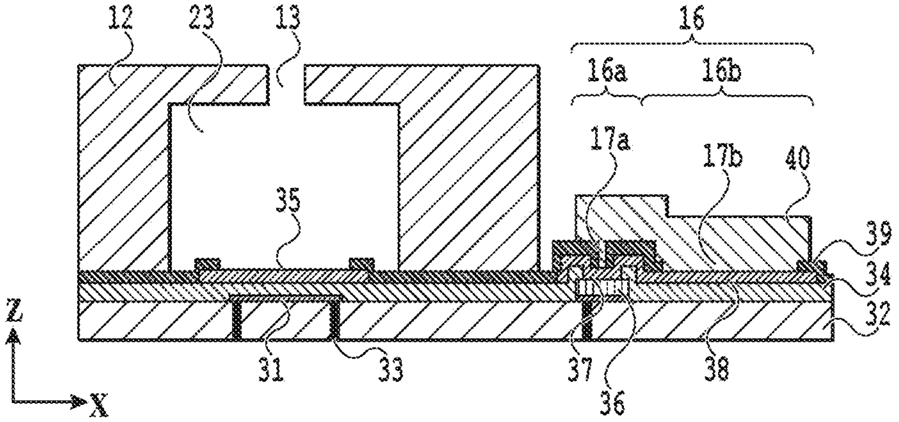

Next, as illustrated in FIG. 6D, a layer made of Au was formed to a thickness of 400 nm over the entire surface of the substrate, followed by photolithography and wet etching using an etchant containing iodine (I) to form a portion to be the upper layer 40 in each electrode pad portion 16. Thereafter, as illustrated in FIG. 6D, liquid supply paths and ejection ports 13 were formed using an ejection port forming member 12, and a cover plate (not illustrated) was formed on the back side of the substrate. Then, a similar electrical inspection was performed again. The inspection was carried out without a problem as the probing was stably performed and the measured value was stable as well. At this time, the current path was one through which a current would flow through the first openings 17*a* in the film thickness direction from the upper layer 40 (the first path mentioned earlier). Thus, a stable electrical inspection was successfully performed although the middle layer 38 was discontinuous at intermediate portions.

Figure 6E:
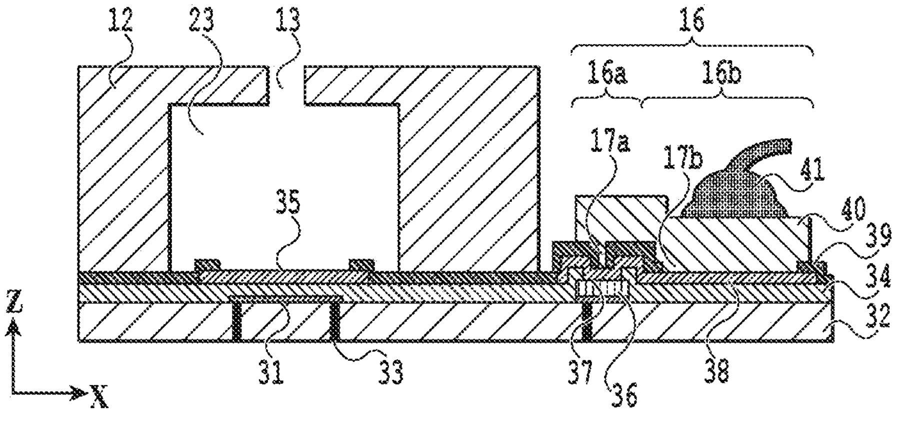

Next, as illustrated in FIG. 6E, wire bonding using a wire material 41 made of Au was performed on the upper layer 40 in each electrode pad portion 16 in order to electrically connect it to an external circuit board. For the wire bonding, ball bonding, wedge bonding, and the like are available. In the present example, ball bonding was employed. Also, the wire diameter of the wire material 41 used was 25 μm.

As described above, in the present example, the surface of each electrode pad portion 16 was not physically damaged or deformed by the probing. Thus, the reliability of electrical connection of the electrode pad portion 16 was improved as compared to a case where the surface was damaged by the probing. Moreover, although the middle layer 38 in some of the electrode pad portions 16 was discontinuous at the step portion, its effect was eliminated by appropriately forming the upper layer 40. Further, since it was not necessary to form a thick film to hide a probe mark, it was possible to provide a liquid ejection head capable of finer ejection. Furthermore, as the liquid ejection head thus prepared was driven to actually perform an ink ejection operation, the liquid ejection head was able to continue ejecting the liquids without a problem.

Example 2

Example 2 is an example corresponding to the second embodiment described above. In the present example, the configuration of the anti-cavitation layer 35 in Example 1 was changed to a two-layer configuration with an Ir film 35*b* as the upper layer and a Ta film 35*a* as the lower layer, as illustrated in FIG. 3. As for the other steps, similar steps to those in Example 1 were performed to obtain the liquid ejection head in the present example. Note that, in these steps, the Ir film and the Ta film were formed to film thicknesses of 70 nm and 30 nm, respectively.

Such a configuration further improved the adhesion between the underlying first insulating protection layer 34 and the anti-cavitation layer 35. As a result, a liquid ejection head with higher reliability was obtained. Also, as illustrated in FIG. 3, the middle layer 38 in each electrode pad portion 16 had a two-layer configuration with a first layer 38*a* formed as the same layer as the Ta film 35*a* and a second layer 38*b* formed as the same layer as the Ir film 35*b*.

Example 3

Example 3 is an example corresponding to the third embodiment described above. FIG. 4 is a schematic cross-sectional view representing the present example. In the following, the difference from Example 1 will be described. A substrate similar to that in Example 1 was prepared, and a liquid ejection head substrate was made by the same process up to the point before the formation of the anti-cavitation layer 35 (FIG. 6B).

Thereafter, in the present example, three layers of a Ta film 35*c*, an Ir film 35*b*, and a Ta film 35*a* as the third, second, and first layers from the top, respectively, were formed as the layers to be the anti-cavitation layer 35. Note that the thicknesses of the Ta film 35*c*, the Ir film 35*b*, and the Ta film 35*a* were 70 nm, 70 nm, and 30 nm, respectively. Each electrode pad portion 16 was also configured such that the layers to be the middle layer 38 were a first layer 38*a* as the same layer as the Ta film 35*a*, a second layer 38*b* as the same layer as the Ir film 35*b*, and a third layer 38*c* as the same layer as the Ta film 35*c*. Moreover, SiCN as the second insulating protection layer 39 was formed to a thickness of 200 nm on the anti-cavitation layer 35 and the middle layer 38 so as to cover the entire substrate. Thereafter, the second insulating protection layer 39 above each heating element 31 and on each electrode pad portion 16 as well as the Ta film 35*c* and the third layer 38*c* as the upper layers were removed by dry etching to expose the Ir film 35*b* and the second layer 38*b* and form first openings 17*a* and a second opening 17*b*. As the etching, chemical etching with a chlorine gas or a fluorine gas can be performed to expose the Ir surfaces without greatly reducing the film thickness of the Ir films.

In the present example too, an electrical inspection was performed immediately after an opening was formed in each pad portion, i.e., on the substrate after FIG. 6C. In the present example too, as in the description of Example 1, the exposed surface of the electrode pad portion 16 during probing was the second layer 38*b* made of Ir, and no physical damage or deformation was confirmed on the second layer 38*b*, but the measured value was similarly unstable. Thereafter, as in Example 1, an upper layer 40 was formed and an electrical inspection was performed. Like Example 1, the inspection was carried out without a problem as the probing was stably performed and the measured value was stable as well. In the subsequent steps, liquid supply paths and an ejection port forming member 12 were formed over the substrate, and a cover plate was formed on the back side of the substrate, as in Example 1. Thereafter, as in Example 1, bonding was performed on each electrode pad portion 16 using a Au wire. In the present example, as in Examples 1 and 2, the reliability of electrical connection of the electrode pad portion 16 was improved as compared to a case where the electrode pad portion 16 was damaged by probing.

Comparative Example 1

Figure 7:
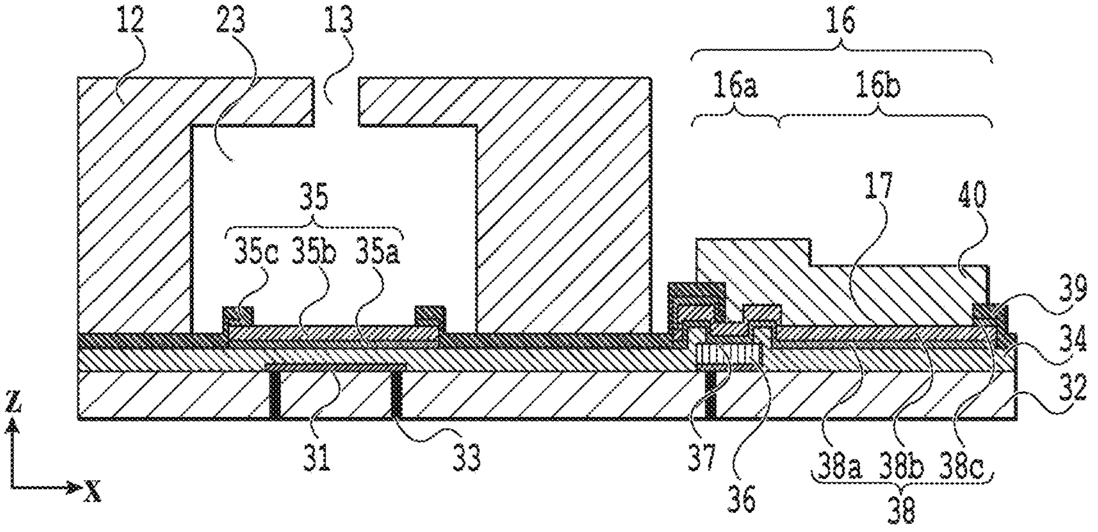
FIG. 7 is a schematic cross-sectional view representing Comparative Example 1.

FIG. 7 is a schematic cross-sectional view representing Comparative Example 1. In the present comparative example, a liquid ejection head substrate was prepared in a similar manner to Example 3 up to the formation of the second insulating protection layer 39, and a single large opening 17 was formed in each electrode pad portion 16. Specifically, the first openings 17*a* and the second opening 17*b* were not formed. An electrical inspection was performed after the single large opening 17 was formed in each electrode pad portion 16. As a result, as in Example 1, the probing was stably performed, but the measured value was unstable on some terminals.

Subsequently, as in Examples 1 to 3, an upper layer 40 was formed. Here, floating of the pattern of the upper layer 40 occurred at the step portion present between the first pad region 16*a* and the second pad region 16*b*. As this part was closely observed, a transformed layer originating from an etching residue of the Ta film 38*c* was found present at the step portion. With the progress of the subsequent steps, the upper layer 40 became detached from the above floating portion in some cases, making it impossible to prepare the desired head.

Comparative Example 2

Figure 8:
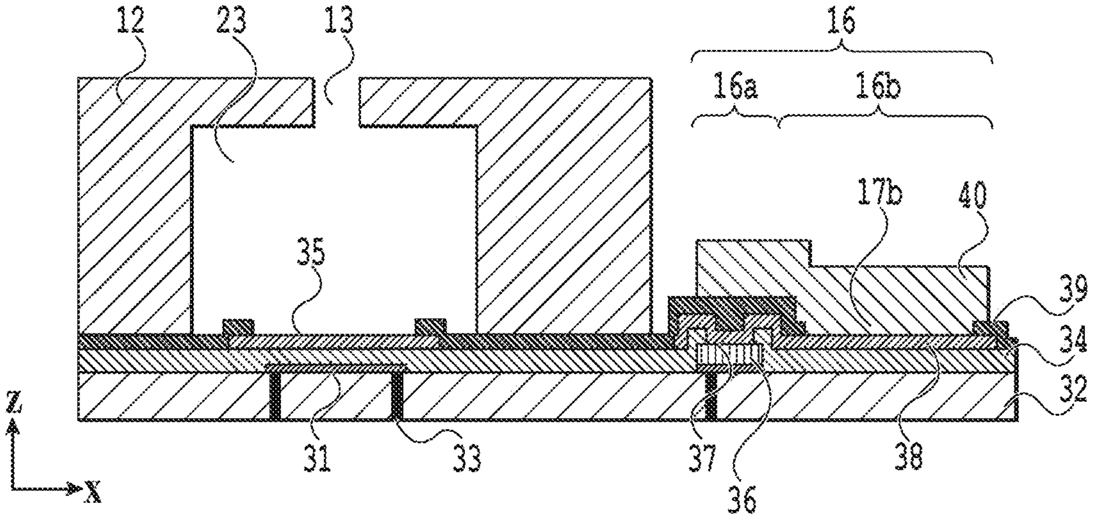
FIG. 8 is a schematic cross-sectional view representing Comparative Example 2.

FIG. 8 is a schematic cross-sectional view representing Comparative Example 2. In the present comparative example, the substrate was prepared through a similar process to that in Example 1 except that the substrate was prepared without only the first openings 17*a* formed. An electrical inspection was performed twice as in Example 1, one in a state where Ir was exposed on each electrode pad portion 16 and one after the upper layer 40 was formed. In each measurement, terminals with unstable measured values were found. As observed in Example 1, each terminal with unstable measurement was observed to have discontinuous Ir at the step portion where the pad portion 16 was present.

Other Embodiments

The disclosure of the present embodiment includes configurations as represented by the following example substrates for a liquid ejection head, example liquid ejection head, and example methods for manufacturing a liquid ejection head substrate.

In accordance with the present disclosure, it is possible to provide a substrate for a liquid ejection head including electrode pads with high electrical reliability and electrical efficiency.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-136975 filed Aug. 25, 2023, which is hereby incorporated by reference wherein in its entirety.

What is claimed is:

1. A substrate for a liquid ejection head comprising:
a heating element configured to generate an energy for ejecting a liquid;
an electrode pad portion having a wiring layer at a lower layer thereof, electrically connected to the heating element through the wiring layer, and electrically connected to an external component through a bonding material; and
an insulating protection layer, wherein
the electrode pad portion further has a lower electrode layer and an upper electrode layer,
the insulating protection layer disposed at a first region overlapping the wiring layer in a film thickness direction has a first opening through which the lower electrode layer and the upper electrode layer are connected, and the insulating protection layer disposed at a position including at least a second region overlapping the bonding material in the film thickness direction has a second opening through which the lower electrode layer and the upper electrode layer are connected.

2. The substrate for a liquid ejection head according to claim 1, further comprising an anti-cavitation layer formed so as to cover the heating element, wherein the lower electrode layer includes a layer made of a same material as at least part of the anti-cavitation layer.

3. The substrate for a liquid ejection head according to claim 2, wherein a film thickness of the anti-cavitation layer is 20 nm or more and 300 nm or less.

4. The substrate for a liquid ejection head according to claim 2, further comprising a first insulating protection layer electrically insulating the heating element and the anti-cavitation layer from each other, wherein the insulating protection layer is a second insulating protection layer covering at least part of the anti-cavitation layer.

5. The substrate for a liquid ejection head according to claim 2, wherein the number of layers forming the lower electrode layer and the number of layers forming the anti-cavitation layer are the same.

6. The substrate for a liquid ejection head according to claim 2, wherein the number of layers forming the lower electrode layer and the number of layers forming the anti-cavitation layer are different.

7. The substrate for a liquid ejection head according to claim 2, wherein the anti-cavitation layer is a layer including a laminate of iridium and tantalum.

8. The substrate for a liquid ejection head according to claim 1, wherein the wiring layer is connected to the lower electrode layer.

9. The substrate for a liquid ejection head according to claim 1, wherein the lower electrode layer in the electrode pad portion contains iridium metal or an iridium alloy.

10. The substrate for a liquid ejection head according to claim 1, wherein the upper electrode layer in the electrode pad portion contains gold.

11. The substrate for a liquid ejection head according to claim 1, wherein the wiring layer contains aluminum.

12. The substrate for a liquid ejection head according to claim 1, wherein no probe mark is formed on the wiring layer.

13. The substrate for a liquid ejection head according to claim 1, wherein a plurality of the first openings are provided per the electrode pad portion.

14. The substrate for a liquid ejection head according to claim 13, wherein the plurality of first openings are provided in a direction in which a plurality of the heating elements are arrayed.

15. The substrate for a liquid ejection head according to claim 1, wherein the second opening is larger in area than the first opening.

16. The substrate for a liquid ejection head according to claim 1, wherein a value of sheet resistance of the lower electrode layer is larger than a value of sheet resistance of the upper electrode layer.

17. The substrate for a liquid ejection head according to claim 1, wherein the first opening and the second opening are independent of each other.

18. A liquid ejection head incorporating a substrate, the substrate comprising:

a heating element configured to generate an energy for ejecting a liquid;

an electrode pad portion having a wiring layer at a lower layer thereof, electrically connected to the heating element through the wiring layer, and electrically connected to an external component through a bonding material; and an insulating protection layer, wherein the electrode pad portion further has a lower electrode layer and an upper electrode layer, the insulating protection layer disposed at a first region overlapping the wiring layer in a film thickness direction has a first opening through which the lower electrode layer and the upper electrode layer are connected, and the insulating protection layer disposed at a position including at least a second region overlapping the bonding material in the film thickness direction has a second opening through which the lower electrode layer and the upper electrode layer are connected.

19. A manufacturing method of a substrate for a liquid ejection head, the substrate including a heating element configured to generate an energy for ejecting a liquid, an electrode pad portion that having a wiring layer at a lower layer thereof, electrically connected to the heating element through the wiring layer, and electrically connected to an external component through a bonding material, an anti-cavitation layer that is formed so as to cover the heating element, and an insulating protection layer, the method comprising:

forming the wiring layer at the lower layer in the electrode pad portion;

forming a lower electrode layer at a region including a first region overlapping the wiring layer in a film thickness direction and a second region overlapping the bonding material in the film thickness direction, the lower electrode layer being made of a same material as at least part of the anti-cavitation layer;

forming the insulating protection layer such that a first opening through which the lower electrode layer and an upper electrode layer are connected is formed at the first region and a second opening through which the lower electrode layer and the upper electrode layer are connected is formed at the second region;

forming the upper electrode layer such that the upper electrode layer covers the first opening and the second opening; and bonding the bonding material to the upper electrode layer.

20. The manufacturing method according to claim 19, wherein the forming the wiring layer includes forming the heating element, and the forming the lower electrode layer includes forming the anti-cavitation layer.

* * * * *